United States Patent

Furuhata et al.

(10) Patent No.: US 8,133,535 B2
(45) Date of Patent: Mar. 13, 2012

(54) ANTIPENETRATING AGENT, SOLVENT INK FOR INKJET PRINTING AND PRINTING METHOD

(75) Inventors: Tomotaka Furuhata, Tomi (JP); Satoshi Takezawa, Tomi (JP); Isao Tabayashi, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 1028 days.

(21) Appl. No.: 12/052,595

(22) Filed: Mar. 20, 2008

(65) Prior Publication Data

US 2009/0029049 A1  Jan. 29, 2009

(30) Foreign Application Priority Data

Mar. 27, 2007  (JP) ................. 2007-082046

(51) Int. Cl.
 *B05D 5/00* (2006.01)
 *B01F 3/12* (2006.01)
(52) U.S. Cl. .............. 427/256; 516/77; 516/78; 516/79; 516/80; 516/88; 516/90; 516/93; 516/99; 516/100; 524/1; 524/611

(58) Field of Classification Search .................. 427/256; 516/77, 78, 79, 88, 90, 93, 99, 100; 524/1, 524/611
See application file for complete search history.

(56) References Cited

U.S. PATENT DOCUMENTS

| | | | | |
|---|---|---|---|---|
| 5,077,170 A | * | 12/1991 | Tsujihiro | .................. 430/108.7 |
| 2004/0038047 A1 | * | 2/2004 | Nakashima et al. | .......... 428/447 |

FOREIGN PATENT DOCUMENTS

| | | |
|---|---|---|
| JP | 06-240192 | 8/1994 |
| JP | 10-140060 | 5/1998 |
| JP | 10-195356 | 7/1998 |
| JP | 2001-311023 | 11/2001 |
| JP | 2004-224910 | 8/2004 |

* cited by examiner

*Primary Examiner* — Timothy J. Kugel
(74) *Attorney, Agent, or Firm* — Ditthavong Mori & Steiner, P.C.

(57) ABSTRACT

An antipenetrating agent is to be added to a solvent ink for preventing penetration of the solvent ink into a medium to be printed. The antipenetrating agent includes inorganic fine particles and a resin soluble in an organic solvent.

3 Claims, No Drawings

ANTIPENETRATING AGENT, SOLVENT INK FOR INKJET PRINTING AND PRINTING METHOD

CROSS-REFERENCE TO RELATED APPLICATIONS

The present application claims priority under 35 U.S.C. §119 to Japanese Patent Application No. 2007-082046, filed Mar. 27, 2007, entitled "Antipenetrating Agent, Solvent Ink and Method for Preventing Penetration." The contents of this application are incorporated herein by reference in their entirety.

BACKGROUND OF THE INVENTION

1. Field of the Invention

The present invention relates to an antipenetrating agent, a solvent ink for inkjet printing, and a printing method.

2. Discussion of the Background

Inkjet printing using such a solvent ink is widely used in printing for signs such as advertising displays and large-sized posters. Generally, solvent ink contains organic solvent (for example, a glycol ether compound or cyclohexanone) as a main component and further contains a colorant such as dye or pigment and a binder resin.

In the inkjet printing using the solvent ink, a printed matter is obtained in the following manner. First, the solvent ink is ejected from an inkjet head and is deposited on a print medium to form an image. The solvent in the solvent ink deposited on the print medium is absorbed in the print medium or removed from the printed surface by heating the print medium. Consequently, dried ink adheres tightly to the printed surface to form an ink coating, thereby obtaining a printed matter.

As print media used for the inkjet printing using the solvent ink, PVC sheets and tarpaulins having solvent-absorption property have been typically used. Recently, in addition to these print media, print media having hydrophilic porous print surface such as ink-jet print paper and plate member for offset printing are also used for the inkjet printing using the solvent ink.

As the solvent ink used in the inkjet printing, for example, JP-A-2001-311023 discloses a solvent ink containing resin particles, JP-A-2004-224910 discloses a solvent ink containing hydrophobic polymer which has a glass transition temperature (Tg) of 40° C. or more, and JP-A-6-240192, JP-A-10-140060 and JP-A-10-195356 disclose solvent inks containing predetermined resins. The contents of these publications are incorporated herein by reference in their entirety.

However, the solvent inks disclosed in JP-A-2001-311023, JP-A-2004-224910, JP-A-6-240192, JP-A-10-140060, and JP-A-10-195356 have a problem that ink bleed easily occurs in the obtained image. In addition, when inkjet printing is performed onto a plate member for offset printing (hereinafter, sometimes referred to as "offset printing plate member") by using the aforementioned conventional solvent ink, the ink penetrates into the print medium so as to reduce the amount of ink coating formed on the printed surface. Accordingly, the ink coating on the obtained offset plate has insufficient water resistance and insufficient water repellency. When this offset plate with the insufficient amount of ink coating is used for the offset printing, the adhesion of ink for offset printing relative to the offset plate is poor, that is, there is a problem that sufficient plate life is not obtained.

SUMMARY OF THE INVENTION

According to one aspect of the present invention, an antipenetrating agent is to be added to a solvent ink for preventing penetration of the solvent ink into a medium to be printed. The antipenetrating agent includes inorganic fine particles and a resin soluble in an organic solvent.

According to another aspect of the present invention, a solvent ink for inkjet printing includes an organic solvent and an antipenetrating agent for preventing penetration of the solvent ink into a medium to be printed. The antipenetrating agent includes inorganic fine particles and a resin soluble in the organic solvent.

According to further aspect of the present invention, a printing method includes providing an antipenetrating agent in an organic solvent to prepare a solvent ink, and ejecting the solvent ink onto a medium to be printed. The antipenetrating agent includes inorganic fine particles and a resin soluble in the organic solvent.

DESCRIPTION OF THE EMBODIMENTS

Antipenetrating Agent

An antipenetrating agent according to an embodiment of the present invention, to be contained in an inkjet solvent ink according to an embodiment of the present invention, includes an organic-solvent-soluble resin and inorganic fine particles.

The organic-solvent-soluble resin is preferably a solvent-soluble resin which is generally used in solvent inks. Examples include rosin-series resins, (styrene) acrylic resins, epoxy resins, polyester resins, modified and/or non-modified olefin resins, silicone resins, urethane resins, terpene resins, petroleum resins, polyamide resins, and cellulose. Among these, the rosin-series resins are preferable. By using a rosin-series resin, further improved penetration inhibiting effect relative to a print medium is obtained. The rosin-series resins mean rosin modified resins. Examples include rosin ester resins, rosin modified phenolic resins, rosin modified maleic resins, and rosin modified alkyd resin. Among these, the rosin modified phenolic resin is particularly preferable because of excellent solubility relative to a typically used solvent for the solvent ink and ejection stability of the solvent ink. Using the rosin modified phenolic resin makes the ink to highly exhibit the penetration inhibiting effect relative to the print medium.

The weight-average molecular weight of the organic-solvent-soluble resin is at least 16,000 and at most 50,000, preferably at least 25,000 and at most 40,000, more preferably at least 26,000 and at most 37,000. In case that the weight-average molecular weight of the organic-solvent-soluble resin is less than 16,000, the penetration inhibiting effect is poor as compared to the case where weight-average molecular weight of the organic-solvent-soluble resin is in the aforementioned range. On the other hand, in case that the weight-average molecular weight of the organic-solvent-soluble resin is more than 50,000, the ejection stability of the ink from the inkjet head is poor as compared to the case where weight-average molecular weight of the organic-solvent-soluble resin is in the aforementioned range. It should be noted that the weight-average molecular weight used in this specification is weight-average molecular weight (Mw) with reference to polystyrene standard which are measured by using a GPC (gel permeation chromatography) analyzer (HLC-8220GPC available from Tosoh Corporation) equipped with (two) columns of Shodex KF-800D and KF-805L and using THF (tetraphdrofuran) as the eluting solvent.

These organic-solvent-soluble resins may be used alone or as a mixture of any two or more thereof.

Examples of the inorganic fine particles include silica fine particles, alumina fine particles, titanium oxide fine particles, zinc oxide fine particles, carbon black fine particles, magnetite, hematite, barium titanate, magnesium titanate, calcium titanate, mica, clay, chromic oxide, magnesium oxide, calcium carbonate, and silicon oxide. Among these, silica fine particles, alumina fine particles, titanium oxide fine particles, and zinc oxide fine particles are preferable and these fine particles are preferably hydrophobized. Using these hydrophobized fine particles improves dispersibility relative to the organic solvent and affinity relative to the resin. These fine particles are hydrophobized by using a generally used hydrophobizing agent such as a silane coupling agent, a titanate coupling agent, polysiloxane, disilazane, and silicone oil. That is, the hydrophobitization is achieved by applying the hydrophobitizing agent to the surfaces of the inorganic fine particles and, in case of a hydrophobitizing agent having functional groups, by reacting the functional groups with the groups of the inorganic fine particle surfaces (for example, dehydrating condensation).

The shape of the inorganic fine particles may be, for example, spherical, cylindrical, acicular, and amorphous. Among these, the spherical shape is preferable.

The mean primary particle diameter of the inorganic fine particles is preferably as small as possible. For example, the mean primary particle diameter of the inorganic fine particles is preferably at least 10 nm and at most 100 nm, more preferably at least 10 nm and at most 30 nm. In case of the inorganic fine particles having a mean primary particle diameter exceeding 100 nm, the ejection stability of the ink from the inkjet head may be poor as compared to the case where the mean primary particle diameter of the inorganic fine particles is in the aforementioned range.

As the aforementioned hydrophobized silica fine particles, titanium oxide fine particles, zinc oxide fine particles, and alumina fine particles, commercially available ones may be used. Examples of the hydrophobized silica fine particles include R972, R976, RY200, RX300 (trade names, available from Nippon Aerosil Co., Ltd.), TG308F, TG709F, TG810G (trade names, available from Cabot Corporation, silica fine particles of which surfaces are treated with polydimethylsiloxane), and H2050EP, H2000/4, H30™, H30TD (trade names, available from Clariant K. K., silica fine particles treated with hexamethyldisilazane, dimethyldichlorosilane, polydimethylsiloxane, and the like). In addition, solvent in which silica fine particles are dispersed, such as NANOBYK-3650 (trade name, available from BYK-chemie Japan, silica fine particle dispersion liquid treated with polysiloxane or the like) may be employed. Examples of the hydrophobized titanium oxide fine particles include TTO-55 (trade name, available from Ishihara Sangyo Kaisha Ltd.), and STT-30A (trade name, available from Titan Kogyo Co.). Examples of the hydrophobized zinc oxide fine particles include ZnO-310 (trade name, available from Sumitomo Osaka Cement Co., Ltd.). Examples of the hydrophobized alumina fine particles include NANOBYK-3610 (trade name, available from BYK-chemie Japan, alumina fine particle dispersion liquid treated with polysiloxane or the like).

These kinds of inorganic fine particles may be used alone or as a mixture of any two or more thereof.

The content of the inorganic fine particles in the antipenetrating agent is preferably at least 2% and at most 20% by mass relative to the total amount of the organic-solvent-soluble resin. If the content of the inorganic fine particles exceeds 20% by mass, the ejection stability of the ink from the inkjet head may be poor as compared to the case where the content of the inorganic fine particles in the antipenetrating agent is in the aforementioned range.

The antipenetrating agent is preferably contained in an amount of at least 5% by mass and to 25% by mass, more preferably at least 10% by mass and 20% by mass relative to the total amount of the solvent ink. In case that the amount of the antipenetrating agent is less than 5% by mass relative to the total amount of the solvent ink, the aforementioned penetration inhibiting effect is deteriorated as compared to the case where the amount of the antipenetrating agent is in the aforementioned range. In case that the amount of the antipenetrating agent is more than 25% by mass relative to the total amount of the solvent ink, the viscosity of the solvent ink is increased and the ejection stability is thus deteriorated as compared to the case where the amount of the antipenetrating agent is in the aforementioned range.

The antipenetrating agent is preferably used as a component of the inkjet solvent ink, not used together with any polymer resin component other than the aforementioned rosin-series resin. The polymer resin component means a component of which weight-average molecular weight measured by the aforementioned GPC analyzer is 8,000 or more (preferably 10,000 or more, more preferably 15,000 or more).

The aforementioned antipenetrating agent can be added to an inkjet solvent ink of an embodiment as will be described later, for example.

(Penetration Inhibiting Method)

The penetration inhibiting method according to an embodiment of the present invention is a penetration inhibiting method for preventing penetration of inkjet solvent ink into a print medium, which includes containing an organic-solvent-soluble resin and inorganic fine particles into the inkjet solvent ink.

The print medium in the penetration inhibiting method according to an embodiment of the present invention is not limited particularly. In case that a plate member for offset printing is used as the print medium, notable effects are obtained for the following reasons.

That is, an offset plate having hydrophilic surfaces (non-image portions) and hydrophobic surfaces (image portions) on its outer surfaces has been conventionally employed in offset printing using a photosensitive resin layer. Ink is deposited only on the hydrophobic surfaces. Deposited on the hydrophilic surfaces is hydrophilic dampening water, not the ink. In this state, the ink deposited only on the hydrophobic surfaces is transferred indirectly to a print medium, thereby obtaining a printed matter. The "dampening water" used here is a mixture of water and IPA (isopropyl alcohol) and the like. The hydrophilic portions of the offset plate are dampened with the dampening water, thereby preventing adhesion of the printing ink to the hydrophilic portions.

In case that inkjet printing is performed onto the offset printing plate member, of which surface is hydrophilic, to form an offset plate, an ink coating formed by the inkjet printing corresponds to the hydrophobic surface and the other portion corresponds to the hydrophilic surface. If the ink penetrates into the plate member, the amount of ink coating formed on the printed surface is reduced, with the result that the ink coating has insufficient water resistance and insufficient water repellency. When this offset plate with the insufficient amount of ink coating is used for the offset printing, the adhesion of ink for offset printing relative to the offset plate is poor. Since the amount of the ink coating is insufficient, the dampening water on the offset plate affects such that the offset plate is undurable (has short plate life) when being repeatedly used for printing.

By using the penetration inhibiting method according to an embodiment of the present invention, however, the ink can be prevented from penetrating into the plate member, thereby obtaining an offset plate with sufficient water resistance and water repellency of the ink coating. In case that the offset plate is used for the offset printing, sufficient adhesion of ink for offset printing relative to the offset plate can be obtained. Since the ink coating has sufficient water resistance and water repellency, the offset plate has excellent plate life without being affected by the dampening water on the offset plate.

(Solvent Ink)

The inkjet solvent ink of this embodiment contains the aforementioned antipenetrating agent and a solvent.

Examples of the solvent include ketones such as acetone, methyl ethyl ketone, cyclohexane, and 2-heptanone; alcohols such as methanol, ethanol, isopropanol, n-hexyl alcohol, isoheptyl alcohol, 2-ethyl hexyl alcohol, n-octyl alcohol, 3-methyl-3-metoxy butanol, and 3-metoxy butanol; ethers such as cellosolve, and butyl cellosolve; hydrocarbons such as toluene, xylene, turpentine, limonene, industrial volatile oil, tetrahydronaphthalene, and decahydronaphthalene; glycols such as ethylene glycol, diethylene glycol, thiodiethylene glycol, tridiethylene glycol, propylene glycol, dipropylene glycol, and tripropylene glycol; glycol ether acetates such as ethylene glycol monoethyl ether acetate, ethylene glycol monobutyl ether acetate, diethylene glycol monoethyl ether acetate, and diethylene glycol monobutyl ether acetate; glycol ethers such as ethylene glycol monohexyl ether, ethylene glycol-2-ethylhexyl ether, ethylene glycol phenyl ether, propylene glycol monoethyl ether, propylene glycol propyl ether, propylene glycol monobutyl ether, diethylene glycol monomethyl ether, diethylene glycol monoethyl ether, diethylene glycol monobutyl ether, diethylene glycol hexyl ether, diethylene glycol-2-ethyl hexyl ether, dipropylene glycol monomethyl ether, dipropylene glycol monoethyl ether, dipropylene glycol monobutyl ether, dipropylene glycol propyl ether, triethylene glycol monomethyl ether, triethylene glycol monoethyl ether, triethylene glycol monobutyl ether, and tripropylene glycol monomethyl ether; esters such as 2,2,4-trimethyl-1,3-pentanediol monoisobutyrate, triethylene glycol di(2-ethylbutyrate), propylene carbonate, ethyl lactate, butyl lactate, methyl acetoacetate, ethyl acetoacetate, diacid ester (DBE), and 3-methyl-3-methoxy butyl acetate; and pyrrolidones such as N-methyl-2-pyrrolidone, but not particularly limited thereto. These solvents may be used alone or as a mixture of any two or more thereof in consideration of the solubility of used antipenetrating agent, ejection stability of the ink, and the drying property of the ink on a medium to be printed. The content of the solvent is preferably at least 50% by mass and 99% by mass relative to the total amount of the solvent ink.

The solvent ink may contain colorants such as dye and pigment, if necessary. As the colorant, various inorganic and organic dyes and pigments which are generally used in solvent inks for inkjet printing may be used. Examples of dyes include C.I. Pigment Yellow 93, 95, 109, 110, 120, 128, 138, 139, 151, 154, 155, 173, 180, 185, and 193, C.I. Pigment Orange 34, 36, 43, 61, 63, and 71, C.I. Pigment Red 122, and 202, solid solution of C.I. Pigment Red 122 and 202, C.I. Pigment Blue 15:3 and 15:4, C.I. Pigment Violet 19, 23, and 33, C.I. Pigment Black 7, titanium oxide, alumina, zinc oxide, hollow resin fine particles, mica, isinglass, and aluminum fine particles. The particle diameter of pigment is preferably 150 nm or less in the mean particle size from the viewpoint of color density, hue, and ink stability of the ink. On the other hand, examples of dyes include C.I. Solvent Yellow 1, 2, 3, 13, 14, 19, 21, 22, 29, 36, 37, 38, 39, 40, 42, 43, 44, 45, 47, 62, 63, 71, 76, 79, 81, 82, 83:1, 85, 86, 88, and 151; C.I. Solvent Red 8, 27, 35, 36, 37, 38, 39, 40, 49, 58, 60, 65, 69, 81, 83:1, 86, 89, 91, 92, 97, 99, 100, 109, 118, 119, 122, 127, and 218; C.I. Solvent Blue 14, 24, 25, 26, 34, 37, 38, 39, 42, 43, 44, 45, 48, 52, 53, 55, 59, 67, and 70; and C.I. Solvent Black 3, 5, 7, 8, 14, 17, 19, 20, 22, 24, 26, 27, 28, 29, 43, and 45. These colorants may be used alone or as a mixture of two or more thereof. On the other hand, the solvent ink may be used as a transparent ink when containing no dye or pigment. The colorant may be added to ink in a selected amount suitable for desired print density without impairing ejection stability of the ink. The content of the colorant in ink is preferably at least 0.1% by mass and 15% by mass relative to the total amount of the solvent ink.

The solvent ink according to an embodiment of the present invention may contain additives other than the aforementioned components, for example, conductivity adjusters, surfactants, ultraviolet absorbers, antifoam agents, and antioxidants.

Examples of conductivity adjusters include carbons and ionic compounds. In case of adding such a conductivity adjuster, the content of the adjuster is preferably at least 0.01% by mass and 5% by mass relative to the total amount of the solvent ink.

Examples of surfactants include polyoxyethylene alkyl ether compounds, polyoxyethylene sorbitan compounds, and perfluoroalkyl ethylene compounds. In case of adding such a surfactant, the content of the surfactant is preferably at least 0.01% by mass and 3% by mass relative to the total amount of the solvent ink.

Examples of ultraviolet absorbers include benzotriazole compounds, hindered amine compounds, and hydroxyphenyl triazine compounds. In case of adding such an ultraviolet absorber, the content of the ultraviolet absorber is preferably at least 0.01% by mass and 8% by mass relative to the total amount of the solvent ink.

Examples of antifoam agents include silicone oil, fatty acid ester compounds, and phosphate ester compounds. In case of adding such an antifoam agent, the content of the antifoam agent is preferably at least 0.01% by mass and 3% by mass relative to the total amount of the solvent ink.

Examples of antioxidants include phenolic compounds, amine compounds, and phosphate compounds. In case of adding such an antioxidant, the content of the antioxidant is preferably at least 0.01% by mass and 3% by mass relative to the total amount of the solvent ink.

As for values for physical properties of the solvent ink according to an embodiment of the present invention, the solvent ink is preferably adjusted to have a viscosity of from 3 to 15 mPa·S and have a surface tension of from about 20 to 35 mN/m, in consideration of the ejection stability of the ink from the inkjet head. Viscosities used in this specification are values measured by using Digital Viscomate VM-100A (available from Yamaichi Electronics Co., Ltd.) under an environmental temperature of 25° C. Surface tensions are values measured by using a surface tensiometer (available from Kyowa Interface Science Co., Ltd.) of Wilhelmy plate method type under an environmental temperature of 25° C. and an environmental humidity of 50% RH.

It is preferable that the solvent ink according to an embodiment of the present invention is filtered by a filter of which aperture size is from about 0.1 to 10 μm if necessary to remove rough and large particles in the ink before subjected to inkjet printing.

(Print Medium)

The print medium to be subjected to inkjet printing using the solvent ink according to an embodiment of the present invention is preferably a print medium having a hydrophilic porous print surface, such as an inkjet paper or an offset printing plate member. Among such print media, a surface printing plate member such as an offset printing plate member is more preferable.

There are various kinds of surface printing plate members according to printing systems. Most of the surface printing plate members are plate members having a photosensitive undercoating layer on a substrate and a hydrophilic layer (hydrophilic porous surface) on the surface of the photosensitive undercoating layer. JP-A-2001-105762 and JP-A-2003-255563 disclose such surface printing plate members. The contents of these publications are incorporated herein by reference in their entirety. As the substrate of the plate member, a metal sheet such as a steel sheet plated with aluminum or chromium may be employed. As another cheaper substrate, a water resist substrate such as a water resistant paper, a plastic film, or a paper laminated with plastic may be employed. The layer thickness of the plate member is preferably from 100 to 300 μm and the thickness of the hydrophilic layer on the surface is preferably from 5 to 30 μm.

For forming a surface printing plate, a method of forming a hydrophilic/hydrophobic plate by exposing the plate member to laser beam according to image information to remove the hydrophilic layer on the exposed portion has been generally employed. On the other hand, a method of forming a hydrophilic/hydrophobic plate by applying a hydrophobic ink to the plate member using the inkjet printing technique can be also employed. According to this method, no laser is required so that a surface printing plate can be obtained by a simple and cheaper device arrangement.

In case of using the solvent ink containing the antipenetrating agent according to an embodiment of the present invention to form a plate using the inkjet printing technique, an ink coating having sufficient water resistance and water repellency is formed on the surface of the plate member. The plate with the ink coating formed thereon can be suitably used as an offset plate.

The solvent ink containing the antipenetrating agent according to an embodiment of the present invention can form an ink coating having excellent adhesion even in case of inkjet printing to a non-penetrative printing plate such as a grained aluminum plate. Accordingly, the plate with the ink coating formed thereon can be also suitably used as an offset plate.

Using the antipenetrating agent according to an embodiment of the present invention, there is provided a solvent ink which can be efficiently prevented from penetrating into a print medium even when the inkjet printing is performed to the print medium having a hydrophilic porous surface.

According to the solvent ink containing the antipenetrating agent according to an embodiment of the present invention, when inkjet printing is performed onto an offset printing plate member, the penetration of ink into the plate member is prevented so that the amount of an ink coating formed on the print surface of the plate member is increased. Accordingly, an offset plate with the ink coating having sufficient water resistance and water repellency can be obtained. When the offset plate is used for offset printing, sufficient adhesion of ink for offset printing relative to the offset plate can be obtained. Accordingly, the offset plate has excellent plate life.

Though the reason why the aforementioned effects can be obtained by the antipenetrating agent according to an embodiment of the present invention is not so clear, the inventors of this invention attribute the aforementioned effects to at least the combination between the organic-solvent-soluble resin and the inorganic fine particles.

The resin is preferably a rosin-series resin, more preferably a rosin-modified phenolic resin. Accordingly, the penetration inhibiting effect of the antipenetrating agent according to an embodiment of the present invention relative to the print medium is improved.

The inorganic fine particles are preferably hydrophobized silica fine particles. Accordingly, an offset plate obtained by inkjet printing onto an offset printing plate member using the solvent ink containing the antipenetrating agent has improved plate life.

The print medium is preferably a print medium having a hydrophilic porous surface to be printed on, particularly, a plate member for offset printing. According to the print medium as mentioned above, the penetration inhibiting effect is achieved at a higher level.

An inkjet solvent ink according to an embodiment of the present invention contains an antipenetrating agent as described above and the inkjet solvent ink is preferably an ink for printing a print medium having a hydrophilic porous surface to be printed on. Even when inkjet printing is performed to a print medium having a hydrophilic porous surface to be printed on, such as an inexpensive inkjet paper, using this inkjet solvent ink, obtained image has less ink bleed because of the penetration inhibiting effect.

An embodiment of the present invention also provides a penetration inhibiting method, for preventing the penetration of an inkjet solvent ink into a print medium, which comprises adding an organic-solvent-soluble resin and inorganic fine particles into the inkjet solvent ink The penetration inhibiting method according to an embodiment of the present invention can exhibit excellent penetration inhibiting effect because the organic-solvent-soluble resin and the inorganic fine particles as the antipenetrating agent are used.

In the penetration inhibiting method according to an embodiment of the present invention, it is preferable that the adding amount in total of said organic-solvent-soluble resin and the inorganic fine particles is in a range of at least 5% by mass and 25% by mass relative to the total amount of said inkjet solvent ink. In case that the adding amount in total of the resin and the inorganic fine particles is less than 5% by mass relative to the total amount of the solvent ink, the obtained penetration inhibiting effect is lower than that in case where the content is in the aforementioned range. On the other hand, in case that the adding amount in total of the resin and the inorganic fine particles exceeds 25% by mass relative to the total amount of the solvent ink, the viscosity of the obtained solvent ink is higher than that in case where the content is in the aforementioned range, thus reducing the ejection stability.

Hereinafter, examples according to an embodiment of the present invention will be described, but the present invention is not limited to the following examples.

Example 1

A solvent, a dye, and an antipenetrating agent shown in Table 1 were mixed and solved at a temperature of 45° C., the mixture was filtered by a stainless steel mesh of which aperture size is 2 μm. In this manner, a solvent ink of Example 1 was obtained.

TABLE 1

| (Example 1) | | Parts by mass |
|---|---|---|
| Solvent | Mixture of ethylene glycol monobutyl ether acetate and propylene glycol monoethyl ether acetate (4:1 by volume ratio) | 80 |

TABLE 1-continued

| (Example 1) | | Parts by mass |
|---|---|---|
| Dye | C.I. Solvent Black 7 | 2 |
| Antipenetrating agent | Rosin modified phenolic resin (TAMANOL 414, available from Arakawa Chemical industries, Ltd) | 15 |
| | Hydrophobized silica fine particles (TG-308F, available from Cabot Corporation | 3 |

Examples 2-5

Solvent inks of Examples 2 through 5 were obtained in the same manner as Example 1 except that solvents, dyes, and antipenetrating agents shown in Table 2 through Table 5 were used respectively.

TABLE 2

| (Example 2) | | Parts by mass |
|---|---|---|
| Solvent | Mixture of ethylene glycol monobutyl ether acetate and propylene glycol monoethyl ether acetate (4:1 by volume ratio) | 77 |
| Dye | C.I. Solvent Black 7 | 2 |
| Antipenetrating agent | Rosin modified phenolic resin (TAMANOL 414, available from Arakawa Chemical Industries, Ltd) | 17 |
| | Hydrophobized silica fine particles (H30TD, available from Clariant K.K.) | 4 |

TABLE 3

| (Example 3) | | Parts by mass |
|---|---|---|
| Solvent | Mixture of ethylene glycol monobutyl ether acetate and propylene glycol monoethyl ether acetate (4:1 by volume ratio) | 72 |
| Dye | C.I. Solvent Black 7 | 2 |
| Antipenetrating agent | Rosin modified phenolic resin (TAMANOL 414, available from Arakawa Chemical industries, Ltd) | 18 |
| | Hydrophobized silica fine particle dispersion liquid (NANOBYK3650, available from BYK-chemie) | 8 |

TABLE 4

| (Example 4) | | Parts by mass |
|---|---|---|
| Solvent | Mixture of ethylene glycol monobutyl ether acetate and propylene glycol monoethyl ether acetate (4:1 by volume ratio) | 76 |
| Dye | C.I. Solvent Black 7 | 2 |
| Antipenetrating agent | Rosin modified phenolic resin (TAMANOL 414, available from Arakawa Chemical industries, Ltd) | 18 |
| | Hydrophobized silica fine particle dispersion liquid (NANOBYK3650, available from BYK-chemie) | 4 |

TABLE 5

| (Example 5) | | Parts by mass |
|---|---|---|
| Solvent | Mixture of ethylene glycol monobutyl ether acetate and propylene glycol monoethyl ether acetate (4:1 by volume ratio) | 78 |
| Dye | C.I. Solvent Black 7 | 2 |
| Antipenetrating agent | Rosin modified phenolic resin (TAMANOL 414, available from Arakawa Chemical industries, Ltd) | 17 |
| | Hydrophobized silica fine particle dispersion liquid (NANOBYK3610, available from BYK-chemie) | 3 |

Example 6

A mixture of ethylene glycol monobutyl ether acetate and propylene glycol monoethyl ether acetate (4:1 by volume ratio) was prepared as a solvent, Carbon Black fine particles (MA100, available from Mitsubishi) were prepared as inorganic fine particles, and rosin modified phenolic resin (TAMANOL 414, available from Arakawa Chemical Industries, Ltd) was prepared as an organic-solvent-soluble resin. After 10 parts by mass of the solvent and 3 parts by mass of the inorganic fine particles were mixed, the mixture was treated by a ball mill treatment using zirconia beads of 0.3 mm in diameter for 10 hours so as to disperse the inorganic particles. To the treated mixture, 70 parts by mass of the solvent and 17 parts by mass of a organic-solvent-soluble resin were added, mixed, and solved at a temperature of 45° C., the mixture was filtered by a stainless steel mesh of which aperture size is 2 μm. In this manner, a solvent ink of Example 6 was obtained.

Comparative Examples 1, 2

Solvent inks of Comparative Examples 1 and 2 were obtained in the same manner as Example 1 except that solvents, dyes, and antipenetrating agents shown in Table 6 and Table 7 were used respectively.

TABLE 6

| (Comparative Example 1) | | Parts by mass |
|---|---|---|
| Solvent | Mixture of ethylene glycol monobutyl ether acetate and propylene glycol monoethyl ether acetate (4:1 by volume ratio) | 80 |
| Dye | C.I. Solvent Black 7 | 2 |
| Antipenetrating agent | Rosin modified ester resin (PENSEL AZ, available from Arakawa Chemical industries, Ltd) | 18 |

TABLE 7

| (Comparative Example 2) | | Parts by mass |
|---|---|---|
| Solvent | Mixture of ethylene glycol monobutyl ether acetate and propylene glycol monoethyl ether acetate (4:1 by volume ratio) | 80 |
| Dye | C.I. Solvent Black 7 | 2 |
| Antipenetrating agent | Styrene acrylic resin (St/BA/2EtHA = 70/15/15) | 18 |

St: styrene, BA: butyl acrylate, 2EtHA: 2-ethylhexyl acrylate (Evaluation of Solvent Ink)

According to printing tests conducted using the following inkjet printer and print media, the solvent inks of Examples 1 through 6 and Comparative Examples 1, 2 were evaluated.

[Inkjet Printer]

An inkjet printer as a testing machine specialized from an inkjet printer (UJF-605C available from Mimaki Engineering Co., Ltd.) provided with a piezohead was employed. Though the inkjet printer UJF-605C is a UV printer, a UV irradiator thereof was removed for specializing as a testing machine. Printing tests were conducted after the temperature of the inkjet head was set to a temperature of 30° C. and each of the aforementioned inks was filled. Printing was performed with 1200 dpi/16 pass.

[Print Media]

Plate members each of which has an ink absorptive layer and a surface hydrophilic layer formed on a substrate were used as the print media. The surface hydrophilic layer had a composition in which polyvinyl alcohol is mixed with silica particles.

Evaluation of Solvent Ink of Example 1

Printing was performed to the aforementioned print medium using the aforementioned inkjet printer and the solvent ink of Example 1. The obtained printed matter was dried at a temperature of 100° C. for 1 minute so as to obtain a printing plate member A. The inkjet printing was conducted with no recognizable nozzle aberrations such as nozzle clogging and deflection.

The printing plate member A was observed under an optical microscope (450× magnification), with the result that an ink coating formed on the printing plate member was confirmed. In addition, the water contact angle of a printed portion (printing rate: 100%) was measured (water drop, CA-V available from Kyowa Interface Science Co., Ltd., after 100 msec of contact). As a result, the water contact angle of the printed portion was 90° or more. This means that the printed portion has high water repellency. On the other hand, the water contact angle of non-printed portion was 20°. Accordingly, the printing plate member A has a strong contrast of hydrophobic/hydrophilic properties between the printed portion and the non-printed portion.

As the offset printing was conducted by a printer Shinohara 52 with Super Tekplus ink using the printing plate member A, 8000 pieces of printed matter were outputted with good dot reproducibility.

Evaluation of Solvent Ink of Example 2

A printing plate member B was obtained in the same manner as Example 1 except that the solvent ink of Example 2 was used.

The printing plate member B was observed under the optical microscope (450× magnification), with the result that an ink coating formed on the printing plate member was confirmed. In addition, the water contact angle of a printed portion (printing rate: 100%) was measured, with the result that the water contact angle of the printed portion was 90° or more. This means that the printed portion has high water repellency.

As the offset printing was conducted in the same manner as Example 1 except that the printing plate member B was used, 7000 pieces of printed matter were outputted with good dot reproducibility.

Evaluation of Solvent Ink of Example 3

A printing plate member C was obtained in the same manner as Example 1 except that the solvent ink of Example 3 was used.

The printing plate member C was observed under the optical microscope (450× magnification), with the result that an ink coating formed on the printing plate member was confirmed. In addition, the water contact angle of a printed portion (printing rate: 100%) was measured, with the result that the water contact angle of the printed portion was 90° or more. This means that the printed portion has high water repellency.

As the offset printing was conducted in the same manner as Example 1 except that the printing plate member C was used, 11,000 pieces of printed matter were outputted with good dot reproducibility.

Evaluation of Solvent Ink of Example 4

A printing plate member D was obtained in the same manner as Example 1 except that the solvent ink of Example 4 was used.

The printing plate member D was observed under the optical microscope (450× magnification), with the result that an ink coating formed on the printing plate member was confirmed. In addition, the water contact angle of a printed portion (printing rate: 100%) was measured, with the result that the water contact angle of the printed portion was 90° or more. This means that the printed portion has high water repellency.

As the offset printing was conducted in the same manner as Example 1 except that the printing plate member D was used, about 6000 pieces of printed matter were outputted with good dot reproducibility.

Evaluation of Solvent Ink of Example 5

A printing plate member E was obtained in the same manner as Example 1 except that the solvent ink of Example 5 was used.

The printing plate member E was observed under the optical microscope (450× magnification), with the result that an ink coating formed on the printing plate member was confirmed. In addition, the water contact angle of a printed portion (printing rate: 100%) was measured, with the result that the water contact angle of the printed portion was 90° or more. This means that the printed portion has high water repellency.

As the offset printing was conducted in the same manner as Example 1 except that the printing plate member E was used, about 6000 pieces of printed matter were outputted with good dot reproducibility.

Evaluation of Solvent Ink of Example 6

A printing plate member F was obtained in the same manner as Example 1 except that the solvent ink of Example 6 was used.

The printing plate member F was observed under the optical microscope (450× magnification), with the result that an ink coating formed on the printing plate member was confirmed.

As the offset printing was conducted in the same manner as Example 1 except that the printing plate member F was used, about 5000 pieces of printed matter were outputted with good dot reproducibility.

Evaluation of Solvent Ink of Comparative Example 1

A printing plate member G was obtained in the same manner as Example 1 except that the solvent ink of Comparative Example 1 was used.

The printing plate member G was observed under the optical microscope (450× magnification), with the result that an ink coating formed on the printing plate member was not confirmed. In addition, the water contact angle of a printed portion (printing rate: 100%) was measured, with the result that the water contact angle of the printed portion was 48°.

As the offset printing was conducted in the same manner as Example 1 except that the printing plate member G was used, dots of half-tone portions of printed matter were blurred from the start of the printing.

Evaluation of Solvent Ink of Comparative Example 2

A printing plate member H was obtained in the same manner as Example 1 except that the solvent ink of Comparative Example 2 was used.

The printing plate member H was observed under the optical microscope (450× magnification), with the result that an ink coating formed on the printing plate member was not confirmed. In addition, the water contact angle of a printed portion (printing rate: 100%) was measured, with the result that the water contact angle of the printed portion was 69°.

As the offset printing was conducted in the same manner as Example 1 except that the printing plate member H was used, dots of half-tone portions of printed matter were blurred from the start of the printing.

As apparent from the results as mentioned above, the water contact angles of the printed portions of the printing plate members A, B, C, D, E, and F obtained by using the solvent inks of Examples 1 through 6 are large so that it is found that the ink penetration to the print media can be efficiently prevented. On the other hand, the water contact angles of the printed portions of the printing plate member G and H obtained by using the solvent inks of Comparative Examples 1 and 2 are small so that it is apparent that the ink penetrates the print media.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An antipenetrating agent to be added to a solvent ink for preventing penetration of the solvent ink into a medium to be printed, the antipenetrating agent comprising:
   a resin soluble in an organic solvent; and
   inorganic fine particles,
   wherein the antipenetrating agent contains at least 2% by mass and at most 20% by mass of said inorganic fine particles with respect to the mass of the resin, and
   wherein said resin comprises a rosin-series resin.

2. An antipenetrating agent to be added to a solvent ink for preventing penetration of the solvent ink into a medium to be printed, the antipenetrating agent comprising:
   a resin soluble in an organic solvent; and
   inorganic fine particles,
   wherein the antipenetrating agent contains at least 2% by mass and at most 20% by mass of said inorganic fine particles with respect to the mass of the resin, and
   wherein said resin comprises a rosin-modified phenolic resin.

3. An antipenetrating agent to be added to a solvent ink for preventing penetration of the solvent ink into a medium to be printed, the antipenetrating agent comprising:
   a resin soluble in an organic solvent; and
   inorganic fine particles,
   wherein the antipenetrating agent contains at least 2% by mass and at most 20% by mass of said inorganic fine particles with respect to the mass of the resin, and
   wherein said inorganic fine particles comprise hydrophobized silica fine particles.

* * * * *